United States Patent [19]

Kools

[11] 4,010,434
[45] Mar. 1, 1977

[54] RADIALLY ANISOTROPIC MAGNET BODY

[75] Inventor: Franciscus Xaverius Nicolaus Maria Kools, Eindhoven, Netherlands

[73] Assignee: U.S. Philips Corporation, New York, N.Y.

[22] Filed: Jan. 14, 1976

[21] Appl. No.: 649,140

Related U.S. Application Data

[63] Continuation of Ser. No. 507,366, Sept. 18, 1974, abandoned.

[30] Foreign Application Priority Data

Sept. 26, 1973 Netherlands .................... 7313231

[52] U.S. Cl. .............................................. 335/302
[51] Int. Cl.² ........................................ H01F 7/02
[58] Field of Search ........................... 335/302, 233

[56] References Cited

OTHER PUBLICATIONS

Ferrimag 1, Crucible Steel Company of America, 8/55.

*Primary Examiner*—Harold Broome
*Attorney, Agent, or Firm*—Frank R. Trifari; Carl P. Steinhauser

[57] ABSTRACT

A sintered, radially anisotropic, permanent magnetizable body consisting of a ferrite of the formula $MeO.6 Fe_2O_3$, wherein Me is at least one of the metals barium, strontium and lead. The body has a closed annular shape with an inside diameter which is at least 0.8 times the outside diameter.

1 Claim, 1 Drawing Figure

U.S. Patent     Mar. 1, 1977     4,010,434
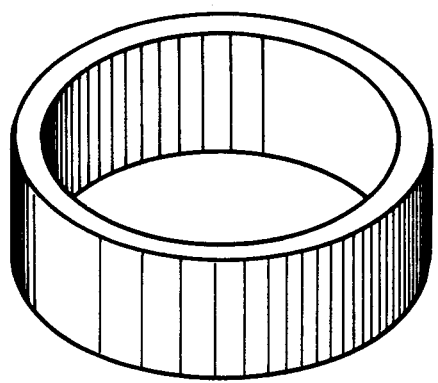

RADIALLY ANISOTROPIC MAGNET BODY

This is a continuation of application Ser. No. 507,366, filed Sept. 18, 1974, and now abandoned.

The invention relates to a curved, sintered, radially anisotropic, permanent magnetisable body essentially consisting of a ferrite of the formula $MeO.6Fe_2O_3$, wherein Me is at least one of the metals barium, strontium and lead. The term radially anisotropic is to be understood to mean that the body is magnetisable much more easily in the radial direction than in other directions. The said ferrites have a hexagonal crystal structure and show an easy axis of magnetisation in the direction of the hexagonal axis. Small particles of said ferrites have a plate shape perpendicular to the hexagonal axis. Permanent magnetisable bodies are built up from magnetically elementary particles which in this case, as said above, are plate-shaped. Since the bodies are radially anisotropic, the particles are present in the body with their hexagonal axis substantially in the radial direction. For a high remanence of the body a high and preferably a uniform density is necessary. Moreover, for a high remanence in the radial direction an orientation of the particles which is as well as possible in the radial direction is necessary.

In practice, segment-like bodies having a center angle up to 135° are used in the case of such curved bodies. Since the segments are anisotropic in the radial direction, inhomogeneities in density and orientation have been introduced during the manufacture thereof, namely during the formation of the molded body which is sintered afterwards. The inhomogeneities and the structural anisotropy in the molded body cause considerable deformation of the segment during sintering. The sintered body should be given the desired shape, which is done by machining. Said machining results in an increase of cost in the manufacture of the segments. Moreover, the inhomogeneities in density and orientation have a detrimental influence on the magnetic quality and the strength of the segment.

As regards curved bodies one is restricted in practice to segments, because curved, sintered, radially anisotropic bodies of a different shape always show cracks and are therefore not useful. It has not been found that said cracks are a result of mechanical stresses which are built up during the cooling because the coefficients of thermal expansion in the radial direction and in the tangential direction are different. Said stresses can easily exceed the strength of the material.

According to the invention the body has a closed annular shape with an inside diameter which is at least 0.8 times the outside diameter. In a ring having such a diameter ratio the largest stresses after cooling are smaller than the strength of the material. The rings thus do not show cracks. With a diameter ratio smaller than 0.8 the sintered body is no longer a closed ring but it is broken into a number of pieces or the sintered body shows radial or tangential cracks which are not acceptable for practical purposes.

In manufacturing anisotropic permanent magnetisable bodies the formation of the molded body occurs in a magnetic fields which orients the particles of the ferrite. In the case of a radially anisotropic body a radial magnetic field is used. Since a homogeneous radial magnetic field is difficult to realise it is to be preferred to give the moulded body, prior to sintering, an after-treatment which suppresses the occurrence of unfavourable thermal stress distributions during the heating of the moulded body. The invention therefore also relates to a method of manufacturing such a body in which a powder of the ferrite is formed into a molded body in a radial magnetic field and is sintered, and in which the density of the material of the molded body is first increased by hydrostatic compression.

The FIGURE in the drawing shows an annular magnetic body consisting of $BaFe_{12}O_{19}$. The outside diameter is 35.1 mm and the inside diameter is 29.8 mm. The ratio between them is 0.85. The body has a density of 4.9 g/cm. The remanence in radial direction is 4100 Gauss.

Starting from a finely ground powder of $BaFe_{12}O_{19}$, an annular molded body having an outside diameter of 38.2 mm and an inside diameter of 31.0 mm was manufactured in a radial magnetic field. After having provided the molded body in a rubber bag it was recompressed with a hydrostatic pressure of 1000 kg/cm². It was then heated in air at a rate of 160° C/hour to 1250° C, which temperature was maintained for two hours after which it was cooled to room temperature at a rate of 40° C/hour.

What is claimed is:

1. A curved, sintered, radially anisotropic, permanently magnetisable body essentially consisting of a ferrite of the formula $MeO.6Fe_2O_3$, wherein Me is at least one of the metals barium, strontium and lead, said body having a closed annular shape with an inside diameter which is at least 0.8 times the outside diameter.

* * * * *